Sept. 10, 1929.    J. E. PFLUEGER    1,727,936
ARTIFICIAL BAIT
Filed Jan. 26, 1923    3 Sheets-Sheet 1
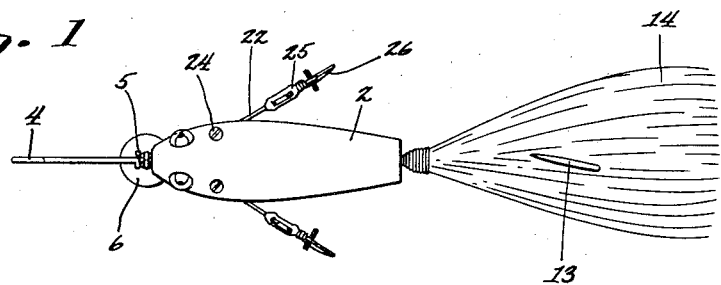
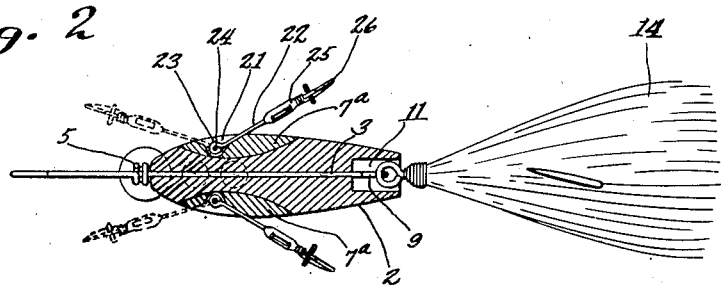
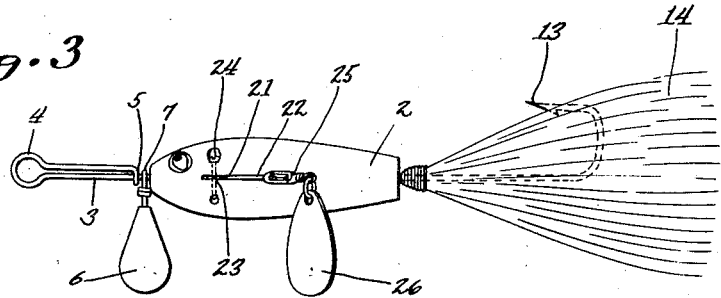
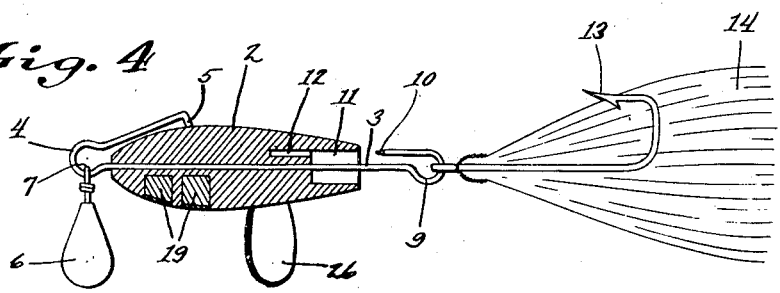
Inventor
Joseph E. Pflueger
By Brockett, Hyde + Milburn
Attorneys Sept. 10, 1929.    J. E. PFLUEGER    1,727,936
ARTIFICIAL BAIT
Filed Jan. 26, 1923    3 Sheets-Sheet 2
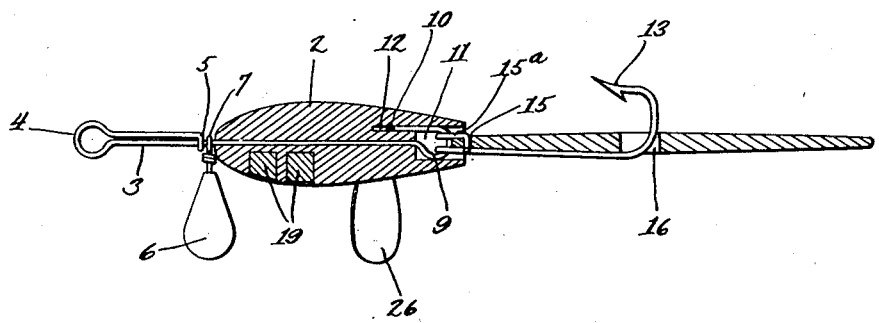
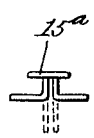
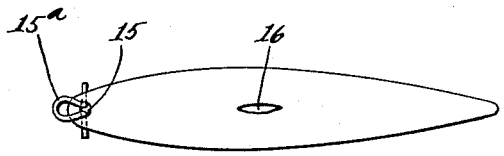
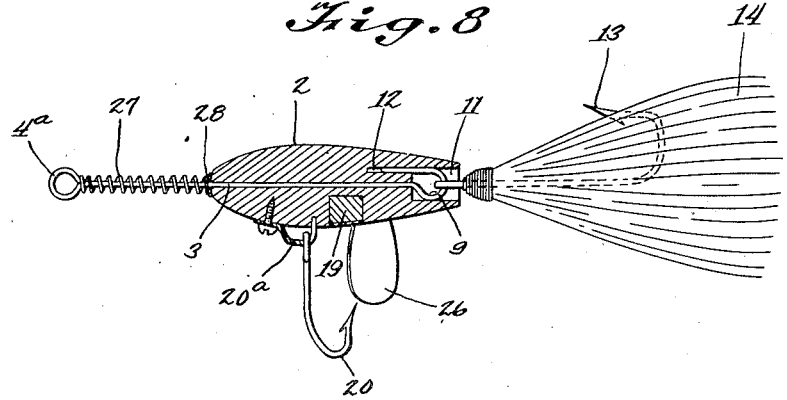
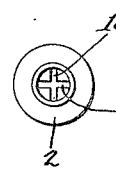
Inventor
Joseph E. Pflueger
By Brockett, Hyde & Milburn
Attorneys Sept. 10, 1929.  J. E. PFLUEGER  1,727,936
ARTIFICIAL BAIT
Filed Jan. 26, 1923  3 Sheets-Sheet 3

Inventor
Joseph E. Pflueger
By Brockett, Hyde & Milburn
Attorneys

Patented Sept. 10, 1929.

1,727,936

UNITED STATES PATENT OFFICE.

JOSEPH E. PFLUEGER, OF AKRON, OHIO, ASSIGNOR TO THE ENTERPRISE MANUFACTURING COMPANY, OF AKRON, OHIO, A CORPORATION OF OHIO.

ARTIFICIAL BAIT.

Application filed January 26, 1923. Serial No. 615,047.

This invention relates to improvements in artificial fish baits, such as shown by Comstock, 271,424, Jan. 30, 1883.

The objects of this invention are to provide improved means for attachment of line, hook, bait and sinker to an artificial minnow body or the like; more particularly to provide an artificial minnow bait with a shaft adapted for adjustable movement therethrough, said arrangement providing means for ready attachment of a hook, line, sinker and bait including frog, pork rind, minnow or fish gullet.

It is a further object of this invention to provide means for holding the hook in fixed position with respect to the bait body and furthermore to provide means for preventing relative rotary movement between the shaft and minnow body, so as to maintain the hook in proper upright position. A still further object is to provide means for limiting the swinging movement of the hook at the rear end so as to prevent tangling of the same with the line.

Another object of this invention is to provide lure arms which extend substantially horizontally; to provide adjustable and automatically reversible lures for co-operation with the hook; to provide means for limiting the swinging movements of the lure arms; and furthermore to arrange lure arms on opposite sides of an artificial minnow body in such manner that they will swing only in a horizontal plane.

Further objects of the invention will be apparent from the following description and claims when considered together with the accompanying drawings.

Figure 10:
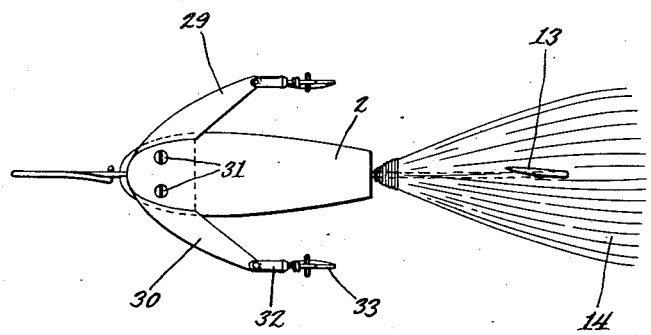
Figure 11:
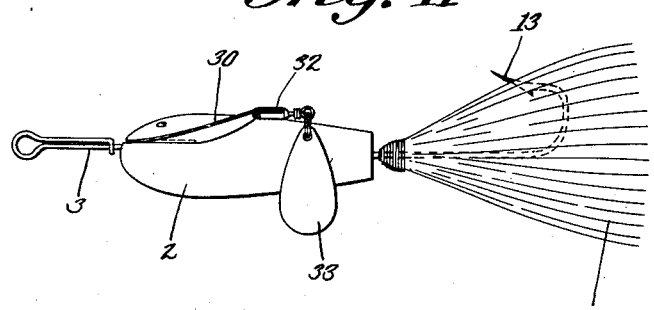
Figure 12:
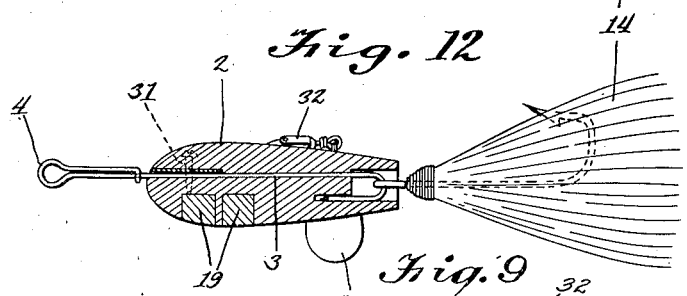
Figure 9:
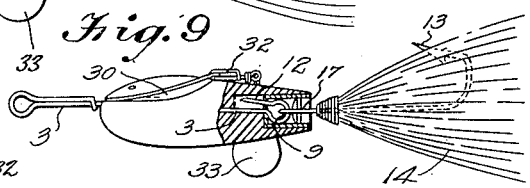
Figure 13:
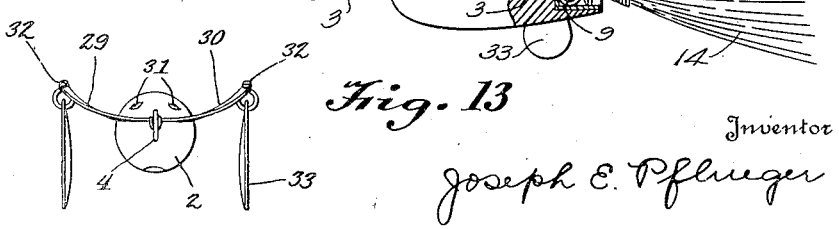

Fig. 1 is a plan view of my improved artificial minnow bait; Fig. 2 is a horizontal section; Fig. 3 is a side elevation; Fig. 4 is a longitudinal vertical section; Fig. 5 illustrates the means of applying pork rind bait or other suitable baiting material; Fig. 6 is a detail view of an attaching eye for the pork rind bait or other baiting material; Fig. 7 shows a pork rind bait or other baiting material in plan; Fig. 8 illustrates a modified form of invention with a spring for normally maintaining the adjustable shaft in position; Fig. 9 is a side elevation of a slightly modified bait, the rear end portion of the bait body being in section; Fig. 10 is a plan view of a further modification; Fig. 11 is a side elevation of the same; Fig. 12 is a longitudinal vertical sectional view of the same; Fig. 13 is a front end view of the same; and Fig. 14 is a rear end elevation of the bait body shown in Fig. 9.

The artificial bait body 2 is here illustrated as representing a minnow, although the artificial bait may be made in any other suitable form. Extending lengthwise and substantially centrally through the artificial minnow body is an opening through which extends an adjustable shaft 3 of suitable resilient material, as for instance, wire. The shaft 3 has its forward end bent back upon itself to form a looped portion 4, while its extreme end portion 5 is formed as a hook to engage about the main body of the wire at a point near the end of the bait body 2. The sinker 6 has its eye 7 mounted upon the shaft 3 preferably between the hook 5 and the end of the bait body, although it may be mounted on the loop 4, as shown in Fig. 4. The bait body may be made of wood or other suitable material. The other end of the shaft 3 is bent back upon itself to form a looped portion 9, the end of the shaft being pointed as shown at 10. The rear end of the bait body is formed with a cavity 11 which can be suitably lined with wear resisting material if found necessary, and this cavity terminates in the restricted cavity or slot 12 which is adapted to receive the end portion of the shaft and to prevent relative rotatable movement of the same with respect to the bait body. The hook 13 can be placed in the position shown in Fig. 3 or in inverted position, as may be desired. Hook 13 has at all times a certain degree of movement with respect to the shaft, but it is limited in such movement by striking against the rear edge of the cavity. Thus the danger of the hook 13 becoming entangled in the line or other parts is minimized.

The looped portion 9 is adapted to receive the eye of hook 13 which can be concealed by the well known buck tail hair, feathers or other material 14 suitably secured to the shank of the hook. In order to attach the hook 13, the shaft 3 is moved to the position illustrated in Fig. 4 after releasing the hook portion 5 therefrom, the shaft 3 being sufficiently resilient to permit adjustment of the forward front end of the shaft to the position illustrated in Fig. 4. The pointed end 10 of the shaft is then in position to receive the eye of the hook 13 and upon drawing the shaft forwardly through the minnow body the rear end portion of the shaft will pass into the slot 12 and the hook portion 5 can be engaged with the shaft 3 either with or without the sinker, as may be desired.

Instead of using buck tail hair or feathers 14, a plain hook, fly hook or any other suitable form may be used, my arrangement permitting ready exchange of hooks. When using the form of pork rind bait as illustrated in Fig. 7, an eye 15ª of wire or like material is inserted in the hole 15 and is placed over the pointed end 10 of the shaft 3 so as to provide a loose connection. The slit 16 is then placed down over the end of hook 13. Then upon drawing the shaft 3 through the bait body in the manner above described, the hook together with the pork rind or other baiting material will be maintained in proper position, the pork rind or other baiting material extending through a substantially horizontal plane except for the wiggling action to which it may be subjected as the bait is drawn through the water.

If so desired, the rear end of the minnow body may be provided with a horizontally disposed slot 17 and a vertically disposed slot 18, the latter to receive the fish hook eye and the former to permit entrance of the shaft loop to the bait body. In the embodiment illustrated in Figs. 9 and 14, the cavity 11 of the fish bait body has mounted therein a metal thimble 17ª provided at its rear end with the slots 17 and 18, said slots lying within the slots 11, as indicated in Fig. 9. The vertically disposed slot 18 permits entrance of the shaft loop 9 into the cavity 11 while the slot 17 receives the eye of the fish hook and thereby prevents rotary movement of the hook with respect to the bait body and limits to an almost negligible degree the amount of rotary movement of the shaft 3 with respect to the bait body. In this way the hook is maintained in proper position with respect to the bait body. The bait body may be made off-center so as to point upwardly as it is drawn through the water, or any other suitable balancing means may be used, such as a weight or weights embedded in the bait body as indicated at 19. The weight or weights are positioned at the proper point to obtain the angle of balance desired for the bait body.

Another hook 20 may be swivelled to the underside of the bait body, as illustrated in Fig. 8, it being understood that a single, double or other form of hook may be used at this point as well as at the rear of the bait body. The stop 20ª prevents hook 20 from swinging forward and becoming tangled with the line. The line is adapted to be attached to the looped portion 4.

The bait body is provided with longitudinally disposed slots 21 in which are mounted the lure arms, each comprising a rod 22 having an eye 23 through which extend the screws 24 secured in the bait body. The outer end of each of the rods 22 is provided with a swivel connection 25 for the spinner 26. The lure arms are adapted to swing freely upon the screws 24 so as to automatically extend diagonally rearward or forward according to whether the bait is being trolled or is being drawn in the other direction by the fish. The rods 22 may be somewhat resilient so as to yield to the force of the weeds or may be made substantially rigid. The inserts 7ª limit the swinging movement of the lure members, and when a fish is running with the bait, the motion of the bait body through the water will cause the lure arms to automatically reverse so as to occupy the dotted line position indicated in Fig. 2. The spinners not only revolve with the swivels about the axis of the lure arms but also have a wiggling movement of their own upon the swivels, thereby producing a combined motion which is calculated to increase the luring effect. The lure arms may be made of any length desired, so that the spoons or spinners may or may not overlie the point of the hook 13.

Referring again to the modification in Fig. 8, the structure is the same as that heretofore described except that the forward end of the shaft 3 is provided merely with the looped portion 4ª and a coil spring 27 surrounds the shaft 3 between the loop 4ª and the front end of the bait body so as to normally maintain the shaft 3 in the position indicated in Fig. 8. The shaft can, however, be withdrawn through the bait body so as to apply and remove the hook and bait to the rear end thereof; and upon release of the rod it will be returned to the position illustrated in Fig. 8 by force of the spring 27 and maintained in such position until again withdrawn. An eyelet 28 is provided to prevent wear of the bait body and like provision may also be made in the first form of device above described, if so desired.

According to the modified form shown in Figs. 10 to 13 inclusive, the lure arms 29 and 30 are formed of light sheet metal either integrally or separately. Here they are shown as formed integrally, the strip of metal tapering from its middle to its end portions and having its end portions curved slightly upwardly, as indicated in Figs. 11 and 13. These lure arms are suitably secured by the screws 31 in the slit provided in the head portion of the bait body, as clearly illustrated in the drawings. The swivels 32 which carry the spoons 33 are pivotally mounted on the ends of lure arms 29 and 30 so as to swing about substantially vertical axes, as shown in the drawings; thereby permitting a wiggling motion of the spoons as the bait is drawn through the water. The rest of the bait structure in this modified form is the same as in the other forms already referred to, and further description of these details is therefore unnecessary.

What I claim is:—

1. A device of the character described, comprising a body having an opening, a shaft longitudinally adjustable in said opening and provided with an attachment receiving portion, one end portion of said opening being enlarged to completely receive said attachment receiving portion when said shaft is in a certain position of longitudinal adjustment in said opening, and means for maintaining said shaft in said opening in such position of adjustment.

2. A device of the character described, comprising a body having an opening, and a shaft longitudinally adjustable in said opening and provided with a loop portion for receiving an attachment, one end of said opening being enlarged to completely receive said loop portion when said shaft is in a certain position of longitudinal adjustment in said opening, said shaft being provided with means for maintaining said shaft in said opening in such position of adjustment.

3. A device of the character described, comprising a body provided with a main opening with one of the end portions of said opening enlarged, and a shaft longitudinally adjustable in said opening and provided at one end with an attachment receiving loop and a free return end portion, said attachment receiving loop being adapted to lie completely within said enlarged opening portion when said shaft is in a certain position of longitudinal adjustment in said opening, said body being also provided with an additional opening for receiving said shaft return portion when said shaft is in such certain position of adjustment, whereby relative rotary movement between said shaft and said body is prevented, said shaft being provided with means for maintaining said shaft in such position of adjustment.

4. A device of the character described, comprising a body provided with a transverse slot, a one piece sheet metal strip having its middle portion secured in said slot and its end portions projecting from said body to provide lure arms, and spinners secured to the outer ends of said lure arms and movable relative thereto.

5. A device of the character described, comprising a body provided with a transverse slot, and a one piece sheet metal strip having its middle portion secured in said slot and its end portions projecting from said body to form lure arms, said projecting portions being curved slightly upwardly and being rearwardly disposed, the upward curvature and rearward disposition of said projecting portions have a guiding effect upon said body in water.

6. A device of the character described, comprising a body provided with a main opening with one of the end portions of said opening enlarged, and a shaft longitudinally adjustable in said opening and provided with an attachment receiving portion and an arm portion, said attachment receiving portion being adapted to lie completely within said enlarged opening portion when said shaft is in a certain position of longitudinal adjustment in said opening, said body being also provided with an additional opening for receiving said shaft arm portion when said shaft is in such certain position of adjustment, whereby relative rotary movement between said shaft and said body is prevented, and means for maintaining said shaft in such position of adjustment.

7. A device of the character described, comprising a body structure having an opening, a shaft longitudinally adjustable in said opening and provided with a loop to receive the eye of a hook, said body structure being provided at one end of said opening with a pair of slots intersecting at right angles, one of said slots being adapted to permit said shaft loop to be passed therethrough to enable said shaft to be longitudinally adjusted to a certain position in said body structure opening, the other of said slots being adapted to receive the eye of the hook when said shaft is in such position of adjustment and thus serving to prevent rotary movement of said hook with respect to the body structure and to limit to an almost negligible degree rotary movement of said shaft with respect to said body structure, said shaft being provided with means for maintaining it in said opening in such position of adjustment.

8. A device of the character described, comprising a body structure having an opening, a shaft longitudinally adjustable in said opening and provided with a loop to receive the eye of a hook, said body structure being provided at one end of said opening with a pair of slots, one of said slots being adapted to permit said shaft loop to be passed therethrough to enable said shaft to be longitudinally adjusted to a certain position in said body structure opening, the other of said slots being adapted to receive the eye of the hook when said shaft is in such position of adjustment, and thus serving to prevent rotary movement of said hook with respect to the body structure and to limit to an almost negligible degree rotary movement of said shaft with respect to said body structure, and means for maintaining it in said opening in such position of adjustment.

In testimony whereof I hereby affix my signature.

JOSEPH E. PFLUEGER.